(12) United States Patent  (10) Patent No.: US 8,131,919 B1
Gasser et al.  (45) Date of Patent: Mar. 6, 2012

(54) TECHNIQUES FOR CONTROLLING STORAGE DEVICE USE BY PERFORMING A STORAGE DEVICE LOCATION ASSESSMENT OPERATION BASED ON A CURRENT STORAGE DEVICE IDENTIFIER

(75) Inventors: Morrie Gasser, Hopkinton, MA (US); Jun Zhang, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 769 days.

(21) Appl. No.: 11/963,086

(22) Filed: Dec. 21, 2007

(51) Int. Cl.
*G06F 12/00* (2006.01)

(52) U.S. Cl. ............ 711/112; 711/4; 711/111; 711/114; 714/6.1; 714/6.2; 714/6.32

(58) Field of Classification Search .............. 711/4, 111, 711/112, 114; 714/6.1, 6.2, 6.32
See application file for complete search history.

(56) References Cited

U.S. PATENT DOCUMENTS

| | | | |
|---|---|---|---|
| 5,369,758 A * | 11/1994 | Larson et al. | 714/7 |
| 5,721,861 A * | 2/1998 | Ohizumi | 711/114 |
| 5,950,230 A * | 9/1999 | Islam et al. | 711/156 |
| 6,092,169 A * | 7/2000 | Murthy et al. | 711/170 |
| 6,600,967 B2 | 7/2003 | Milligan et al. | |
| 6,775,792 B2 | 8/2004 | Ulrich et al. | |
| 6,862,692 B2 | 3/2005 | Ulrich et al. | |
| 6,871,295 B2 | 3/2005 | Ulrich et al. | |
| 6,877,110 B2 * | 4/2005 | Suzuki et al. | 714/7 |
| 6,990,553 B2 | 1/2006 | Nakayama et al. | |
| 7,096,338 B2 | 8/2006 | Takahashi et al. | |
| 7,240,152 B2 | 7/2007 | Nakayama et al. | |
| 7,263,584 B2 | 8/2007 | Nakayama et al. | |
| 7,305,670 B2 | 12/2007 | Ogasawara et al. | |
| 7,307,832 B1 | 12/2007 | Lewis | |
| 7,340,571 B2 | 3/2008 | Saze | |
| 7,376,785 B2 | 5/2008 | Katsuragi et al. | |
| 7,377,800 B2 | 5/2008 | Gasser | |
| 7,395,396 B2 | 7/2008 | Takahashi et al. | |
| 2008/0028107 A1 * | 1/2008 | Cherian et al. | 710/9 |

* cited by examiner

*Primary Examiner* — Arpan P. Savla
(74) *Attorney, Agent, or Firm* — BainwoodHuang

(57) ABSTRACT

An electronic system includes a framework, data storage circuitry and a controller. The framework includes multiple device slots. The data storage circuitry is arranged to access storage devices installed in the framework. The controller is arranged to receive a current storage device identifier in response to installation of a storage device into a particular device slot of the framework, and perform an electronic storage device location assessment operation based on the current storage device identifier. The controller is further arranged to provide a control signal in response to performing the electronic storage device location assessment operation. The control signal selectively (i) permits the data storage circuitry to overwrite the storage device while the storage device resides in the particular device slot, and (ii) prevents the data storage circuitry from overwriting of the storage device while the storage device resides in the particular device slot.

20 Claims, 6 Drawing Sheets

TECHNIQUES FOR CONTROLLING STORAGE DEVICE USE BY PERFORMING A STORAGE DEVICE LOCATION ASSESSMENT OPERATION BASED ON A CURRENT STORAGE DEVICE IDENTIFIER

BACKGROUND

A conventional data storage system typically includes an array of disk drives and a storage processor (or a storage director). During operation, the storage processor stores data onto and retrieves data from the array of disk drives on behalf of one or more external host devices.

It is common for the data storage system to store data in compliance with a particular RAID (redundant array of inexpensive disks) level, e.g., RAID level 0 (disk mirroring), RAID level 5 (striped data and parity), etc. For example, the conventional data storage system may include three disk drives A1, A2, and A3, which are configured as a first RAID group running RAID level 5 and which are installed in enclosure slots S1, S2, and S3, respectively. The conventional data storage system may further include three other disk drives B1, B2, and B3, which are configured as a second RAID group running RAID level 5 and which are installed in enclosure slots S4, S5, and S6, respectively. In the above-described conventional data storage system, the data on a particular disk drive of a RAID group is capable of being recovered if that particular disk drive fails. For example, suppose that disk drive A2 of the first RAID group fails and that the conventional data storage system notifies a system administrator. Further suppose that the system administrator responds to the failure by removing disk drive A2 from slot S2 and installing a replacement disk drive R into slot S2.

Upon installation of replacement disk drive R into slot S2, the conventional data storage system checks whether there is RAID group information on replacement disk drive R to see whether replacement disk drive R is disk drive A2. Since the RAID group information on replacement disk drive R indicates that the newly installed disk drive within slot S2 is not disk drive A2, the conventional data storage system responds by immediately beginning reconstruction of the data that was stored on disk drive A2 from the remaining data on disk drives A1 and A3, and automatically writing the reconstructed data onto replacement disk drive R in slot S2. In particular, the conventional data storage system saves new RAID group information on replacement disk drive R to indicate that replacement disk drive R now belongs to the first RAID group in place of failed disk drive A2, and then writes the reconstructed data onto replacement disk drive R.

Once this data recovery process is complete, the first RAID group which has now been properly restored (i.e., the first RAID group now includes disk drives A1, R, and A3) is capable of carrying on as before. That is, the conventional data storage system continues with both the first and second RAID groups enjoying normal RAID level 5 operation.

SUMMARY

Unfortunately, there are deficiencies to the above-described conventional data storage system which immediately and automatically begins overwriting a disk drive that replaces an earlier operating disk drive of a RAID group. For instance, in the above-described example, suppose that the system administrator inadvertently replaces failed disk drive A2 in slot S2 with a disk drive from the second RAID group such as disk drive B3. In such a situation, the conventional data storage system immediately begins reconstructing the data that was stored on disk drive A2, and automatically saving that data onto disk drive B3. That is, the conventional data storage system immediately (i) overwrites previous RAID group information on disk drive B3 with new RAID group information to indicate that replacement disk drive R now belongs to the first RAID group, and (ii) overwrites the existing data on disk drive B3 with reconstructed data from disk drive A2.

Unfortunately, as soon as this overwriting process begins, disk drive B3 can no longer be simply added back to the second RAID group. In particular, overwriting the RAID group information of disk drive B3 essentially corrupts disk drive B3 thus preventing its easy re-addition back to the second RAID group. Accordingly, the second RAID group has now lost disk drive B3 and is thus in a more vulnerable position, i.e., the second RAID group will not be able to support data recovery if another disk drive of the second RAID group is lost.

At this point, it should be understood that the scenario of immediately and automatically overwriting a disk drive that belongs to another RAID group can, in some cases, be catastrophic. For example, suppose that a second disk drive of the second RAID group does fail (e.g., disk drive B2) so that two disk drives of the second RAID group are now unavailable. Since two disk drives of the second RAID group are lost, there is insufficient data to support data recovery. As a result, if there is no other existing copy of the data stored in the second RAID group, the data of the second RAID group is permanently lost.

In contrast to the above-described conventional data storage system which immediately and automatically overwrites a disk drive that replaces an earlier operating disk drive of a RAID group, improved techniques control storage device use by inspecting a current identifier of a storage device and controlling access to the storage device based on the current identifier. For example, in the context of RAID groups of storage devices, overwriting a newly installed storage device (e.g., a disk drive) is permissible if the newly installed storage device does not belong to another RAID group. However, overwriting of the storage device can be prohibited if the newly installed storage device belongs to another RAID group and is inadvertently installed into the wrong slot. Such operation provides a user with a level of protection against inadvertently overwriting a storage device that stores useful and perhaps critical data, e.g., a disk drive that stores data for a different RAID group.

One embodiment is directed to an electronic system which includes a framework, data storage circuitry and a controller. The framework includes multiple device slots. The data storage circuitry is arranged to access storage devices installed in the framework. The controller is arranged to receive a current storage device identifier in response to installation of a storage device into a particular device slot of the framework, and perform an electronic storage device location assessment operation based on the current storage device identifier. The controller is further arranged to provide a control signal in response to performing the electronic storage device location assessment operation. The control signal selectively (i) permits the data storage circuitry to overwrite the storage device while the storage device resides in the particular device slot, and (ii) prevents the data storage circuitry from overwriting of the storage device while the storage device resides in the particular device slot.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique controls storage device use by inspecting a storage device identifier of a storage device and controlling access to the storage device based on the storage device identifier. For example, in the context of RAID groups of storage devices, overwriting a newly installed storage device (e.g., a disk drive) is permissible if the newly installed storage device does not belong to another RAID group. However, overwriting of the storage device can be prohibited if the newly installed storage device belongs to another RAID group and is inadvertently installed into a wrong slot. Such operation provides a user with a level of protection against inadvertently overwriting a storage device that stores useful and perhaps critical data, e.g., a disk drive that stores data for a different RAID group.

Figure 1:
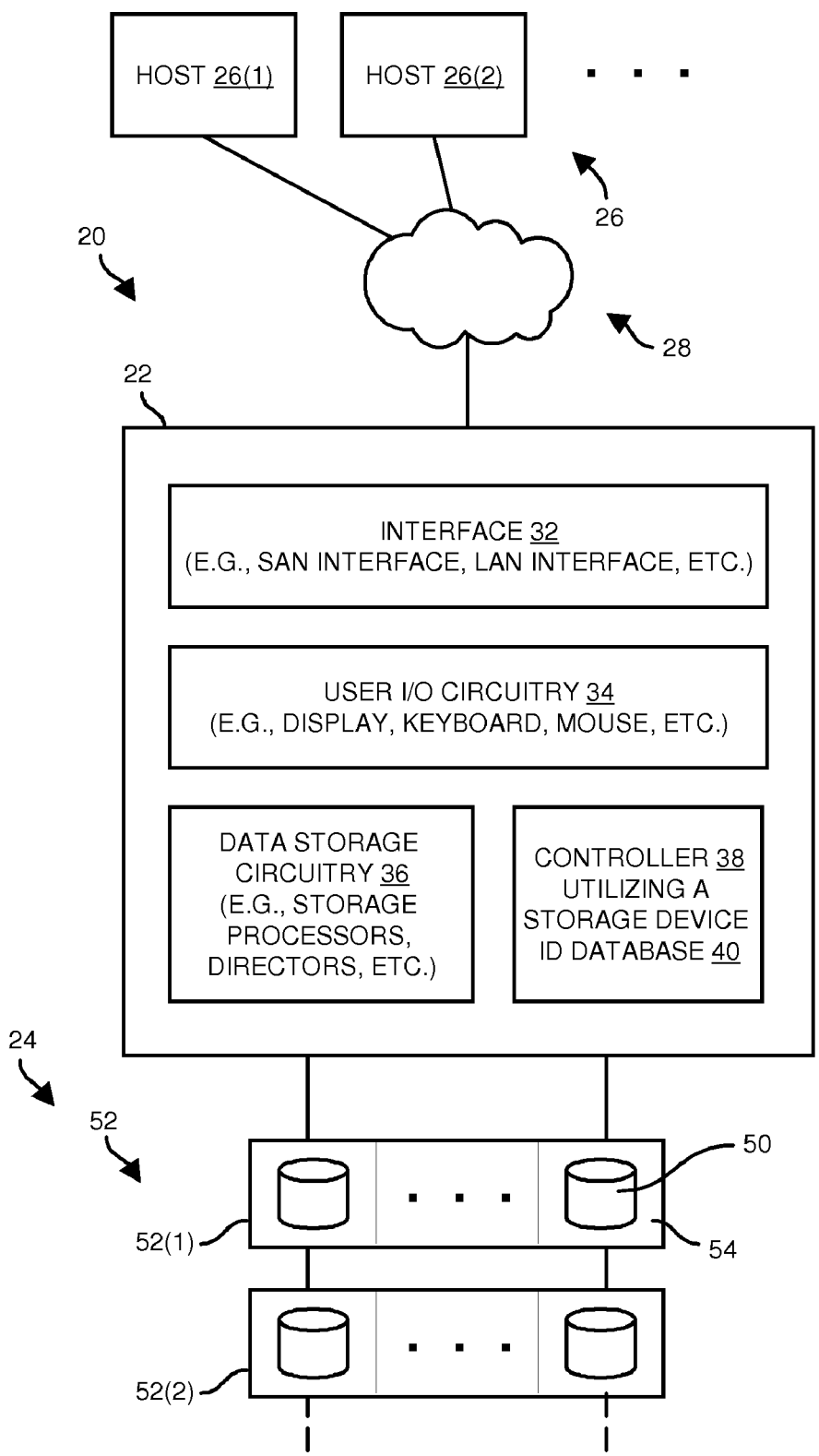
FIG. 1 is a block diagram of a data storage system which is equipped to inspect a storage device identifier and control access to a storage device based on the storage device identifier.

FIG. 1 shows a data storage system 20 which is equipped to control access to storage devices (e.g., the ability to overwrite data on the storage devices) based on storage device identifiers (IDs). The data storage system 20 includes front-end processing circuitry 22 and a storage device framework 24. The front-end processing circuitry 22 is arranged to carry out data storage operations on behalf of a set of external hosts 26(1), 26(2) (collectively, hosts 26) through a communications fabric 28 (e.g., SAN infrastructure, LAN infrastructure, combinations thereof, etc.).

As shown in FIG. 1, the front-end processing circuitry 22 includes an interface 32 (e.g., a SAN interface, a LAN interface, etc.), user I/O circuitry 34 (e.g., a display, a keyboard and mouse, etc.), data storage circuitry 36 (e.g., one or more storage processors, directors and associated memory, etc.) and a controller 38 which utilizes a storage device ID database 40. As will be explained in more detail shortly, the storage device ID database 40 tracks storage device/slot relationships for the data storage system 20.

As further shown in FIG. 1, the storage device framework 24 is a storage array having multiple storage devices 50 (e.g., magnetic disk drives, flash memory drives, etc.) which are housed within one or more storage device enclosures 52(1), 52(2) (collectively, enclosures 52). In particular, each enclosure 52 of the framework 24 defines multiple device slots 54. Each device slot 54 is arranged to receive and support a respective storage device 50.

During data storage system operation, the data storage circuitry 34 is arranged to load data in and retrieve data from the storage device framework 24 on behalf of the hosts 26. Contemporaneously, the controller 38 is arranged to control usage of the storage devices 50 to prevent inadvertent overwriting of useful data on the storage devices 50. In particular, the controller 38 is arranged to read storage device IDs from the storage devices 50 when the storage devices are installed into the device slots 54, and assess whether the storage devices 50 are installed into their correct device slots 54. If there is a discrepancy, the controller 38 is capable of flagging the discrepancy in order to avoid mistakenly interpreting installation of a storage device 50 in the wrong device slot 54 as installation of a replacement storage device 50 which requires an immediate and automatic recovery operation. Accordingly, such an electronic storage device location assessment operation is capable of preventing the data storage circuitry 36 from inadvertently overwriting important data on a storage device 50 that belongs in a different slot 54.

It should be understood that, in some arrangements, the data storage circuitry 34 and the controller 38 are integrated. For example, in such arrangements, storage processors (or directors) may form both the data storage circuitry 34 (i.e., circuitry running data storage application processes) as well as the controller 38 (i.e., circuitry running specialized storage device assessment software) which controls storage device access based on storage device IDs.

In other arrangements, the data storage circuitry 34 and the controller 38 are separately partitioned. For example, in these alternative arrangements, the data storage circuitry 34 may be implemented as specialized, dedicated data storage hardware (e.g., storage processors) while a separate device (e.g., a service processor) forms the controller 38 and perhaps the user I/O circuitry 34. Further details will now be provided with reference to FIG. 2.

Figure 2:
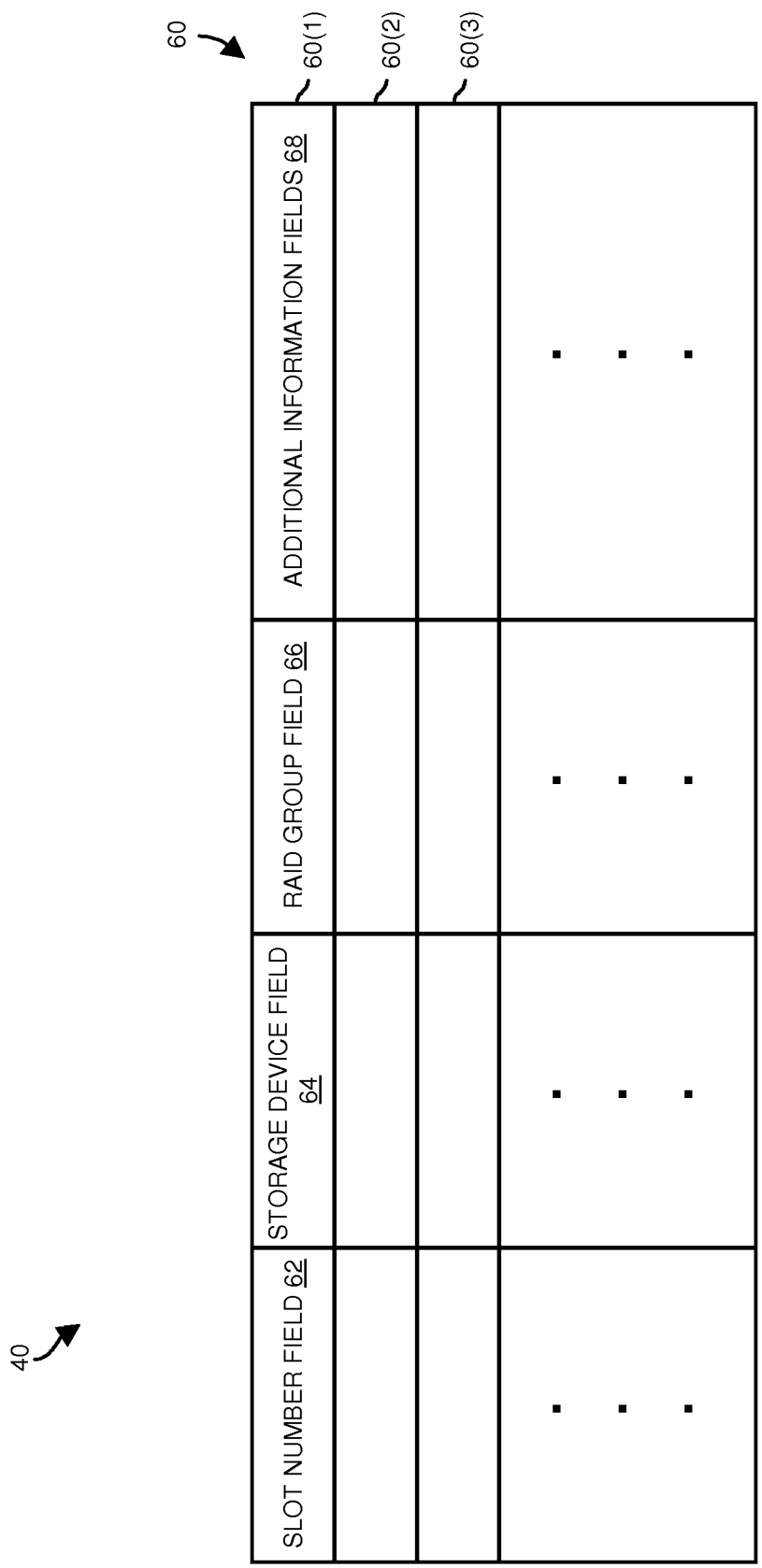
FIG. 2 is a logical view of a database which is utilized by the data storage system of FIG. 1.

FIG. 2 is a logical view of the storage device ID database 40 which is utilized by the controller 38 (FIG. 1). It should be understood that the database 40 is capable of residing in a variety of locations within the data storage system 20 such as in a set of storage devices 50 within the framework 24, in a set of storage devices 50 which are local to the controller 38, partly or wholly cached in semiconductor memory within the front-end circuitry 22, and so on.

As shown in FIG. 2, the storage device ID database 40 includes multiple database entries 60(1), 60(2), 60(3), . . . (collectively, database entries 60). Each database entry 60 includes a slot number field 62, a storage device field 64, a RAID group field 66, and additional information fields 68. The slot number field 62 of each database entry 60 is arranged to contain a slot number which uniquely identifies a particular device slot 54 defined within the framework 24 (also see FIG. 1). The storage device field 64 of each database entry 60 is arranged to contain a storage device ID which uniquely identifies a storage device 50 (FIG. 1) which is initially and properly installed within the device slot 54 identified by the slot number stored in the slot number field 62 of that entry 60. The RAID group field 66 of each entry 60 is arranged to contain a RAID group identifier (e.g., a RAID group number or ID) which identifies a particular RAID group to which the storage device 50 in the slot 54 belongs. The additional information fields 68 of each entry 60 are arranged to contain additional information for that entry 60 (e.g., RAID level, creation date, further identification data regarding the storage device 50, etc.).

Since the slot numbers and the storage device IDs are unique, it should be understood that the entries 60 of the database 40 are capable of being reliably indexed based on slot number and/or storage device ID. Other indexing techniques are suitable for use as well such as use of a yet another field (e.g., a dedicated index field) within each entry 60 to contain a separate, unique database entry index (also see the additional fields 68 in FIG. 2).

When the data storage system 20 is in operation, the controller 38 is arranged to assign and maintain associations between the storage devices 50 and the slot 54, i.e., device-to-slot relationships. In particular, when the data storage system 20 is undergoing initial configuration, the controller 38 (i) creates a database entry 60 for each slot 54 of the framework 24, and (ii) stores a unique slot number in the slot number field 62 of each entry 60 to link that slot number to that entry 60. Then, when a storage device 50 is installed within a particular slot 54 (e.g., at the time of LUN binding), the controller 38 assigns the storage device 50 to that slot 54. That is, as part of the LUN binding process, the controller 38 writes a unique storage device ID onto that storage device 50 (e.g., a unique storage device serial number to a designated location on the storage device 50), and stores the unique storage device ID within the storage device ID field 64 of the entry 60 linked to that particular slot 54 thus establishing a device-to-slot relationship within the database 40. At this time and/or perhaps at later times, the controller 38 is capable of storing additional information in the various fields of that entry 60 as well (e.g., a RAID group assignment in the RAID group field 66, etc). The controller 38 continues populating the database 40 with additional device-to-slot relationships as storage devices 50 install into the device slots 54 of the framework 24.

Once the database 40 is populated with device-to-slot relationships as described above or even concurrently during database population as well, the controller 38 is arranged to confirm proper placement of the storage devices 50 within the slots 54 as storage devices 50 are moved in and out of the framework 24. For example, suppose that a user removes an old storage device 50 from a particular slot 54 and then plugs a new storage device 50 in that slot 54. Such a situation could arise if the data storage system 20 is moved to a different location since it is common practice to remove disk drives from their enclosures prior to transport in order to reduce the weight of the enclosures.

In response to installation of the new storage device 50 in that slot 54, the controller 38 attempts to read a storage device serial number from the newly installed storage device 50, and then accesses the storage device ID database 40. If the controller 38 cannot read a storage device serial number from the new storage device 50, the controller 38 considers the new storage device 50 to be a new addition to the data storage system 20 and assigns a unique storage device serial number as described above, i.e., writes a unique serial number onto the storage device 50 and updates a corresponding database entry 60 with the serial number. Since the recently installed storage device 50 is new, the controller 38 does not need to provide any overwrite protection.

However, if the controller 38 successfully reads a storage device serial number from the newly installed storage device 50, the controller 38 compares the read storage device serial number to the storage device serial number in the storage device field 64 of the database entry 60 linked to the particular slot 54. The controller 38 carries out this comparison operation as a precaution since the newly installed storage device 50 was previously assigned a unique serial number and thus may contain meaningful data.

If the controller 38 does not recognize the newly installed storage device 50 as either the old storage device 50 that was previously installed in that particular slot 54 or a storage device 50 from another slot 54 of the framework 24 (i.e., if the serial numbers match), the controller 38 considers the new installed storage device 50 to be a possible replacement storage device for the old storage device 50 and allows overwrite access. As a further precaution, the controller 38 can optionally be configured to prompt a user prior to enabling overwriting (e.g., perhaps the storage device 50 belongs to a different data storage system). Once the controller 38 concludes that the storage device 50 is to be treated as a replacement, the controller 38 assigns a new storage device ID to the storage device 50 and updates the database entry 60 linked to the particular device slot 54. If the slot 54 is configured to hold a storage device 50 of a RAID group, the controller 38 then allows the data storage circuitry 36 (FIG. 1) is able to carry out a RAID recovery process which restores data, which had been stored on the old storage device 50, onto the newly installed storage device 50 based on data on the remaining storage devices 50 of the RAID group.

However, if the controller 38 recognizes the newly installed storage device 50 as a storage device 50 that belongs in another slot 54 of the framework 24 (i.e., if the serial number of the newly installed storage device 50 does not match the serial number of the storage device 50 for the particular slot 54 but the controller 38 is able to find the serial number in another database entry 60 of the database 40), the controller 38 considers the newly installed storage device 50 to be inadvertently installed into the wrong slot 54 and prevents overwrite access to the storage device 50 while the storage device 50 resides in that slot 54. Accordingly, if the old storage device 50 belonged to another RAID group, the controller 38 does not permit the data storage circuitry 36 (FIG. 1) to carry out any RAID recovery process which would otherwise overwrite meaningful data on the newly installed storage device 50. As a result, no data from the other RAID group is lost. Further details will now be provided with reference to FIG. 3.

Figure 3:
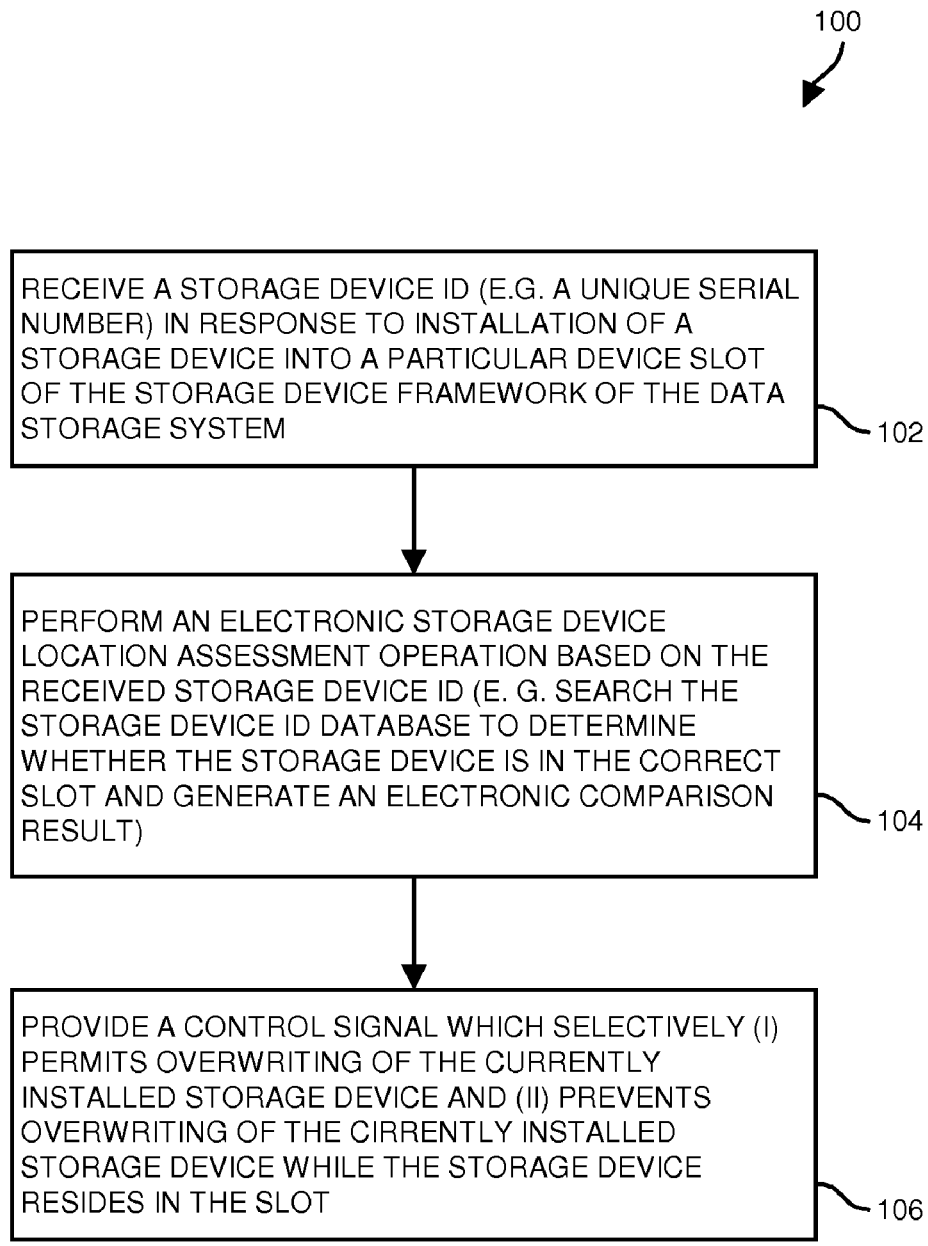
FIG. 3 is a flowchart illustrating a procedure which is performed by the data storage system of FIG. 1.

FIG. 3 is a flowchart of a procedure 100 which is performed by the controller 38 to control storage device use, i.e., to determine whether to allow overwrite access to a storage device 50. The controller 38 carries out this procedure 100 each time a storage device 50 installs into a slot 54 of the storage device framework 24 and prior to allowing the data storage circuitry 36 to write any data to the storage device 50.

In step 102, the controller 38 receives a storage device ID in response to installation of a storage device 50 into a particular device slot 54 of the framework 54. Here, the storage device 50 connects to the framework 54 within the particular device slot 54 and receives power. The storage device 50 then runs a self test and makes itself available to the controller 38. At this time, the controller 38 reads the storage device ID (i.e., the storage device serial number) from the storage device 50 while the storage device 50 remains in the particular device slot 54.

In step 104, the controller 38 performs an electronic storage device location assessment operation based on the received storage device ID. In particular, the controller 38 attempts to identify whether the storage device 50 is in the correct slot 54 or perhaps an incorrect slot 54. Along these lines, the controller 38 reads the contents of the storage device field 64 of the database entry 60 linked to the particular device slot 54. These contents form a storage device serial number for the storage device 50 that was previously installed in the particular device slot 54. The controller 38 then generates a comparison result indicating whether the serial number from the previously installed storage device 50 matches the received serial number from the currently installed storage device 50. Alternatively, the controller 38 looks for an entry 60 containing the storage device ID and then compares the slot ID of that entry to the slot ID for the particular device 54.

In step 106, the controller 38 responds to the storage device location assessment operation by providing a control signal which either (i) permits overwriting of the currently installed storage device 50 while that storage device 50 resides in the particular device slot 54, or (ii) prevents overwriting of the currently installed storage device 50 while that storage device 50 resides in the particular device slot 54. In particular, in the event of a serial number match, the controller 38 provides a first control signal value which permits overwriting. However, if the serial numbers do not match, the controller 38 provides a second control signal value which does not immediately and automatically permit overwriting. The particular value of the control signal determines whether the data storage circuitry 36 is permitted to write to the storage device 50 while the storage device is in the slot 54. As a result, if the storage device 50 is in the wrong slot 54, the data storage circuitry 36 will be prevented from inadvertently corrupting the storage device 50 and possibly losing meaningful data.

In some arrangements, step 104 is a comprehensive assessment which provides additional assistance to the user. In particular, if the controller 38 determines that the serial numbers do not match, the controller 38 further searches the database 40 to determine whether the currently installed storage device 54 belongs in another device slot 54 which is different than the particular device slot 54. If the controller 38 finds the serial number in the storage device field 64 of another database entry 60, the controller 38 notifies a user that the storage device 50 is in the wrong slot 54. In particular, the controller 38 provides a message on a display (see the user I/O circuitry 34 in FIG. 1) indicating that the storage device 50 belongs in another device slot 54. Such a message preferably includes a visual identification of the other device slot 54 within which the storage device 50 belongs (e.g., a slot number, an illustration of the correct slot location on a graphical user interface, etc.). Further details will now be provided with reference to FIGS. 4-6 which provide illustrative examples.

Figure 4:
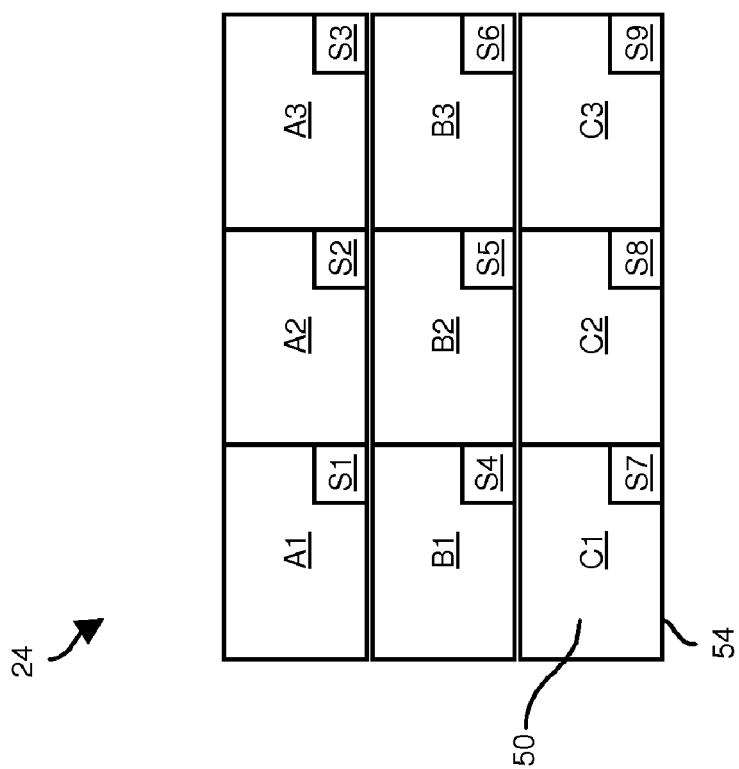
FIG. 4 is an example layout of a portion of the data storage system of FIG. 1.

FIG. 4 is an example layout 200 of storage devices 50 within the slots 54 of the framework 24. As shown, the framework 24 provides nine (9) slots 54 which are identified as slots 51 through S9. For convenience and simplification, the slot numbers of each particular slot 54 are provided in the lower right hand corner, and the storage device numbers of the storage devices 50 installed within each slot 54 are provided in the center.

Each slot 54 houses a storage device 54. In particular, slots 51, S2, and S3 hold storage devices A1, A2, and A3 which form a first RAID group. Similarly, slots S4, S5, and S6 hold storage devices B1, B2, and B3 which form a second RAID group. Likewise, slots S7, S8, and S9 hold storage devices C1, C2, and C3 which form a third RAID group. By way of example only, each RAID group implements RAID level 5.

At this point, it should be understood that the controller 38 has updated the database 40 with the above-described device-to-slot relationships (e.g., at the time of LUN binding). For example, a database entry 60 exists which identifies slot S1 in its slot number field 62, identifies storage device A1 in its storage device field 64, and identifies RAID group "A" in its RAID group field 66, among other things. Similarly, another database entry 60 exists which identifies slot S2 in its slot number field 62, and identifies storage device A2 in its storage device field 64, identifies RAID group "A" in its RAID group field 66, and so on.

Embodiment which Flags all Discrepancies

In one embodiment, the controller 38 is arranged to identify every device/slot discrepancy to the user. The particular details of this embodiment are best described with the following example and reference to FIG. 5.

Figure 5:
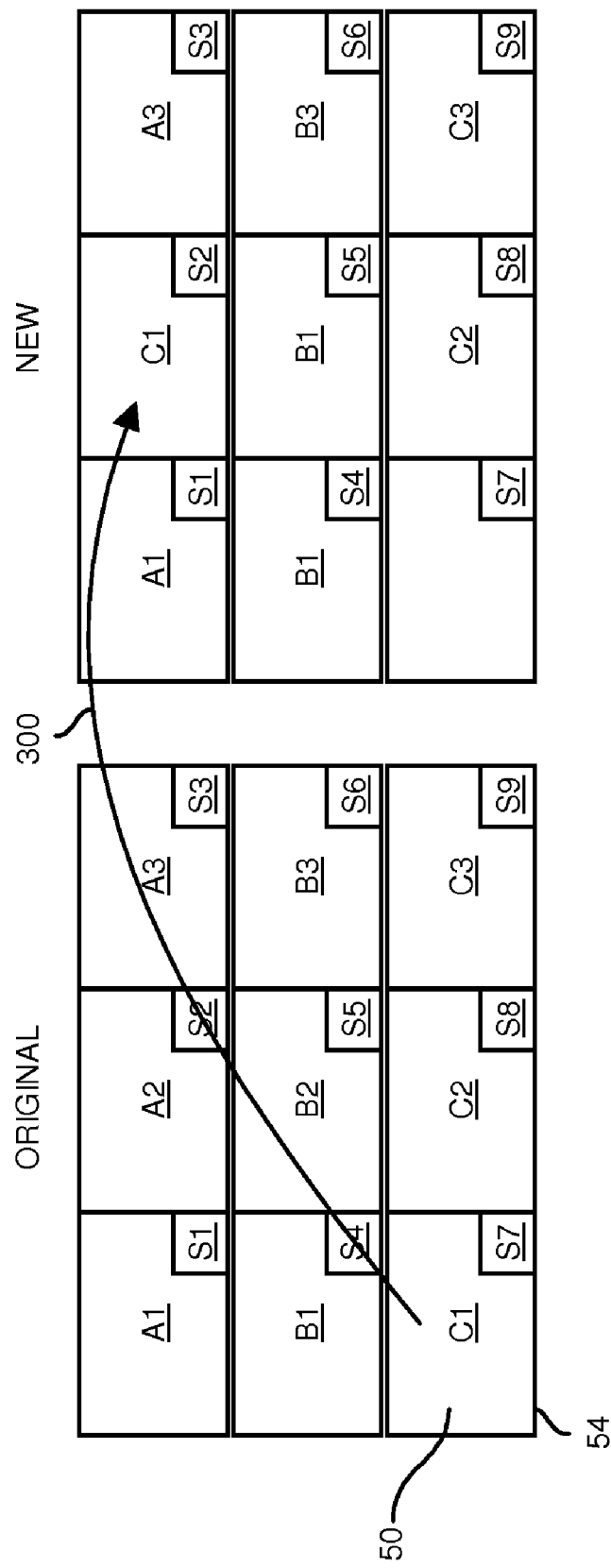
FIG. 5 is the example layout of FIG. 4 before and after certain activity in accordance with a first embodiment.

FIG. 5 shows a situation in which the user removes storage device A2 from slot S2, and inadvertently installs storage device C1 in slot S2 (see the arrow 300). The original view shows the positions of the storage devices 54 prior to the move. The new view shows the positions of the storage devices after the move. Such a situation could arise when the user removes the storage devices 50 from the framework 24 and attempts to re-install the storage devices 50 in their original slots 54 but makes a mistake.

In response to installation of the storage device C1 into slot S2, the controller 38 obtains the storage device ID "C1" (also see step 102 in FIG. 3). This happens shortly after the storage device C1 powers up and prior to the controller 38 providing any access permission to the data storage circuitry 36 (FIG. 1).

Next, the controller 38 searches the database 40 (FIG. 2) to carry out an electronic storage device location assessment operation (also see step 104 in FIG. 3). In particular, the controller 38 compares the received storage device ID "C1" to the storage device ID in the database entry 60 for slot number S2, and determines that the storage device IDs do not match. Alternatively, the controller 38 compares the current slot number "S2" (since storage device C1 was just installed into slot S2) to the slot number of the database entry 60 for the storage device C1 (i.e., slot number "S7"), and determines that the slot numbers do not match. In either non-matching situation and in accordance with this first embodiment, the controller 38 then outputs a message to the user through the user I/O circuitry 34 (FIG. 1) based on this comparison result. The message (e.g., a graphic or other type of visual display) informs the user that the storage device C1 has been installed into the wrong slot and rightly belongs in slot number S7.

To prevent any loss of data, the controller 38 further sends a control signal to the data storage circuitry 36 preventing the data storage circuitry 36 from writing data to (and thus corrupting) the storage device C1 (also see step 106 in FIG. 3). Accordingly, the user is able to remove the storage device C1 from slot S2 and properly install the storage device C1 into slot S7.

Embodiment which Flags Only Critical Situations

In a second embodiment, the controller 38 is arranged not to identify every device/slot discrepancy to the user, but only discrepancies that risk permanent loss of data, i.e., critical situations. The particular details of this second embodiment are best described with the following example and reference to FIG. 6.

However, it should be first understood that the earlier-provided example of FIG. 5 did not pose a critical situation. In particular, storage devices C2 and C3 continued to store their respective RAID data and were installed into their proper respective slots 54, i.e., slots S8 and S9. Accordingly, the data on the storage device C1 is easily recoverable from the RAID data remaining on storage devices C2 and C3. As a result, overwriting and corrupting the storage device C2 in the example of FIG. 5 does not result in any permanent data loss.

Figure 6:
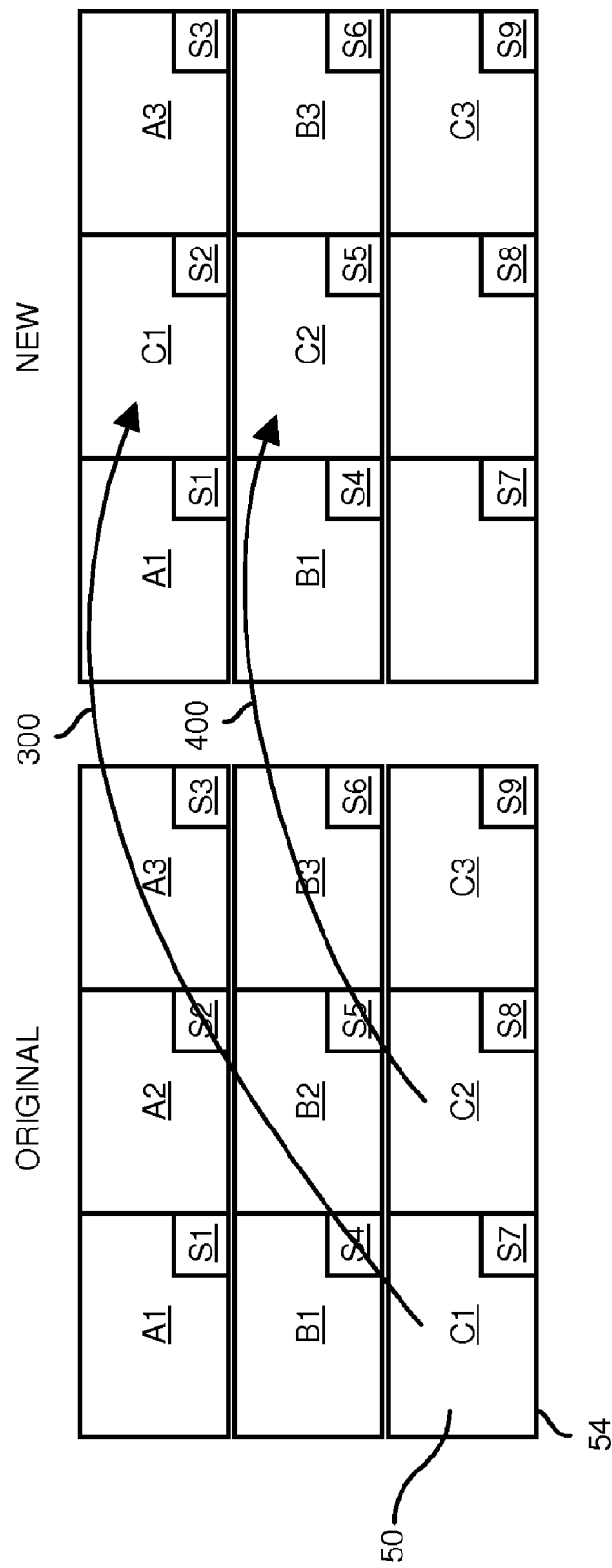
FIG. 6 is the example layout of FIG. 4 before and after certain activity in accordance with a second embodiment.

In contrast, FIG. 6 shows a critical situation in which data would be lost without intervention by the controller 38 and illustrates the operation of the second embodiment. In particular, FIG. 6 shows two storage devices from the same RAID group (e.g., RAID group "C") with the potential of being overwritten. As shown in FIG. 6, the user first removes storage device A2 from slot S2, and inadvertently installs storage device C1 in slot S2 (see the arrow 300). As just mentioned, if the storage devices C2 and C3 reside in their proper slots S8 and S9, the data on storage device C1 can be recovered from the RAID data remaining on storage devices C2 and C3. Accordingly, the situation is not yet critical.

Rather, in such a situation and in accordance with this second embodiment, even though the controller 38 detects that the properly location for the storage device C1 is not slot S7 but is slot S2, the controller 38 is able to see that all other storage devices 50 of the third RAID group (i.e., storage devices C2 and C3) are available and in their proper slots 54 based on earlier receipt of their storage device IDs and confirmation that the storage devices C2 and C3 have not been removed from slots S8 and S9, respectively. As a result of the controller's determination that this is not a critical situation that could result in permanent data loss, the controller 38 allows writing to the storage device C1. In particular, the controller 38 writes a storage device ID (e.g., a new serial number) to the storage device C1 while the storage device C1 remains in slot S2 and updates the database 40. The controller 38 then permits the data storage circuitry 36 to write to the storage device C1. In response the data storage circuitry 36 carries out a RAID recovery process (e.g., RAID level 5 recovery) and writes restored data onto the storage device C1 which now forms part of the first RAID group, i.e., RAID group "A". In some arrangements, the controller 38 prompts the user through the user I/O circuitry 34 for permission to overwrite the storage device C1 prior to any overwriting of the storage device C1.

Conversely, if the controller 38 does not see storage devices C2 and C3 in their proper slots 54 (e.g., the controller 38 performs a check), the situation is critical. For example, one of the storage devices C2 or C3 could have also been removed or could have failed. In this critical situation, the controller 38 prevents overwriting of the storage device C1 while the storage device 50 resides in slot S2. This situation is deemed "critical" and data loss must be prevented because the controller 38 cannot confirm that the data of the third RAID group will not be permanently lost if the storage device C1 is otherwise overwritten since the controller 38 sees more than one storage device 50 missing from the third RAID group.

Reference is now made back to the situation in which the storage device C1 has been installed into slot S2, overwritten, and made part of the first RAID group. Now, further suppose that the user removes the storage device C2 from the slot S8 and installs the storage device C2 into the slot S5 as shown in FIG. 6. Again, the controller 38 obtains the storage device ID "C2" in response to installation of the storage device C2 into slot S5 (again see step 102 in FIG. 3). Such receipt occurs shortly after the storage device C2 powers up in slot 5 and prior to the controller 38 providing any access permission to the data storage circuitry 36.

Next, the controller 38 searches the database 40 (FIG. 2) as part of an electronic storage device location assessment operation (also see step 104 in FIG. 3). The controller 38 compares the received storage device ID "C2" to the storage device ID in the database entry 60 for slot number S5, and determines that the storage device IDs do not match (i.e., the storage device ID for slot S5 is "B2" since storage device B2 was previously in slot S5). As an alternative, the controller 38 compares the current slot number "S5" to the slot number in the database entry 60 for the storage device C2 (i.e., slot number "S8"), and determines that the slot numbers do not match.

In response to this comparison result and in accordance with the second embodiment, the controller 38 then outputs a message to the user through the user I/O circuitry 34 (FIG. 1) informing the user that the storage device C2 has been installed into the wrong slot S5 and rightly belongs in slot number S8. In particular, the controller 38 outputs, on a display (see the user I/O circuitry 34 in FIG. 1), a visual identification of the other device slot within which the storage device C2 belongs.

To prevent any loss of data, the controller 38 further sends a control signal to the data storage circuitry 36 preventing the data storage circuitry 36 from writing data to (and thus corrupting) the storage device C2 (step 106 in FIG. 3). Accordingly, the user is then able to remove the storage device C2 from slot S5 and properly install the storage device C2 back into slot S8 without any data loss.

At this point, although the storage device C1 has been integrated into the first RAID group, the third RAID group data is still available since storage devices C2 and C3 are in slots S8 and S9. Accordingly, if a usable storage device 50 is installed into slot S7, the data storage circuitry 36 will be able to recover the missing data from the remaining storage devices C2 and C3 of the third RAID group.

SUMMARY

As described above, an improved technique controls storage device use by inspecting a current identifier of a storage device 50 and controlling access to the storage device 50 based on the current identifier. For example, in the context of RAID groups of storage devices 50, overwriting a newly installed storage device 50 is permissible if the newly installed storage device 50 does not belong to another RAID group. However, overwriting of the storage device 50 can be prohibited if the newly installed storage device 50 belongs to another RAID group and is inadvertently installed into the wrong slot 54. Such operation provides a user with a level of protection against inadvertently overwriting a storage device 50 that stores useful and perhaps critical data, e.g., a disk drive that stores data for a different RAID group.

While various embodiments of the invention have been particularly shown and described, it will be understood by those skilled in the art that various changes in form and details may be made therein without departing from the spirit and scope of the invention as defined by the appended claims.

What is claimed is:

1. In an electronic system having multiple device slots and a storage device identifier database including multiple database entries corresponding to the multiple device slots, a method of controlling storage device use, the method comprising:

during a logical unit number (LUN) binding process in which a storage device is bound to a particular LUN:
  writing a current storage device identifier associated with the storage device to the storage device; and
  updating a database entry of the storage device identifier database with the current storage device identifier;

receiving the current storage device identifier in response to installation of the storage device into a particular device slot of the electronic system;

performing an electronic storage device location assessment operation based on the current storage device identifier; and in response to performing the electronic storage device location assessment operation, providing a control signal which selectively (i) permits overwriting of the storage device while the storage device resides in the particular device slot, and (ii) prevents overwriting of the storage device while the storage device resides in the particular device slot;

wherein a prior storage device identifier is associated with the particular device slot;

wherein providing the control signal includes:

outputting (i) an overwrite disable value for the control signal which prevents overwriting of the storage device while the storage device resides in the particular device slot when the current storage device identifier does not match the prior storage device identifier and the storage device is a critical disk which belongs to a redundant array of inexpensive disks (RAID) group which is missing at least two disks in their proper locations and (ii) an overwrite enable value for the control signal which permits overwriting of the storage device while the storage device resides in the particular device slot when the current storage device identifier does not match the prior storage device identifier and the storage device is not a critical disk which belongs to a RAID group which is missing at least two disks in their proper location.

2. The method as in claim 1 wherein performing the electronic storage device location assessment operation includes:

generating an electronic comparison result indicating whether the current storage device identifier matches the prior storage device identifier.

3. The method as in claim 2 wherein performing the electronic storage device location assessment operation further includes:

when the comparison result indicates that the current storage device identifier does not match the prior storage device identifier, searching the storage device identifier database to determine whether the storage device belongs in another device slot which is different than the particular device slot.

4. The method as in claim 3 wherein performing the electronic storage device location assessment operation further includes:

in response to searching the storage device identifier database, providing a message on a display indicating that the storage device belongs in another device slot which is different than the particular device slot when the storage device belongs in the other device slot.

5. The method as in claim 4 wherein providing the message on the display includes:

outputting, on the display, a visual identification of the other device slot within which the storage device belongs.

6. The method as in claim 2 wherein performing the electronic storage device location assessment operation further includes:

when the comparison result indicates that the current storage device identifier does not match the prior storage device identifier, prompting a user for permission to overwrite the storage device prior to any overwriting of the storage device.

7. The method as in claim 1 wherein providing the control signal includes:

outputting (i) an overwrite enable value for the control signal which permits overwriting of the storage device while the storage device resides in the particular device slot when the current storage device identifier matches the prior storage device identifier, and (ii) an overwrite disable value for the control signal which prevents overwriting of the storage device while the storage device resides in the particular device slot when the current storage device identifier does not match the prior storage device identifier.

8. The method as in claim 1 wherein providing the control signal further includes:

outputting an overwrite enable value for the control signal which permits overwriting of the storage device while the storage device resides in the particular device slot when the current storage device identifier matches the prior storage device identifier.

9. The method as in claim 1, wherein the electronic system further includes a controller and multiple storage processors;

wherein the storage device is a magnetic disk drive and the multiple device slots are constructed and arranged to receive multiple magnetic disk drives;

wherein the controller is constructed and arranged to receive the current storage device identifier in response to installation of the storage device into the particular device slot;

wherein each storage processor of the multiple storage processors is constructed and arranged to write data received from a set of hosts to the storage device;

wherein preventing overwriting of the storage device while the storage device resides in the particular device slot includes:

stopping, by the controller, the multiple storage processors from overwriting data on the storage device with data which the multiple storage processors received from the set of hosts; and wherein permitting overwriting of the storage device while the storage device resides in the particular device slot includes:

allowing, by the controller, the multiple storage processors to overwrite data on the storage device with data which the multiple storage processors received from the set of hosts.

10. In an electronic system having multiple device slots, a method of controlling storage device use, the method comprising:

receiving a current storage device identifier in response to installation of a storage device into a particular device slot of the electronic system;

performing an electronic storage device location assessment operation based on the current storage device identifier; and in response to performing the electronic storage device location assessment operation, providing a control signal which selectively (i) permits overwriting of the storage device while the storage device resides in the particular device slot, and (ii) prevents overwriting of the storage device while the storage device resides in the particular device slot wherein the current storage device identifier is associated with the storage device;

wherein a prior storage device identifier is associated with the particular device slot;

wherein providing the control signal includes:

outputting (i) an overwrite disable value for the control signal which prevents overwriting of the storage device while the storage device resides in the particular device slot when the current storage device identifier does not match the prior storage device identifier and the storage device is a critical disk which belongs to a redundant array of inexpensive disks (RAID) group which is missing at least two disks in their proper locations and (ii) an overwrite enable value for the control signal which permits overwriting of the storage device while the storage device resides in the particular device slot when the current storage device identifier does not match the prior storage device identifier and the storage device is not a critical disk which belongs to a RAID group which is missing at least two disks in their proper location; and wherein performing the electronic storage device location assessment operation includes:

generating an electronic comparison result indicating whether the current storage device identifier matches the prior storage device identifier;

wherein the electronic system further has a storage device identifier database; and wherein performing the electronic storage device location assessment operation further includes:

when the comparison result indicates that the current storage device identifier does not match the prior storage device identifier, searching the storage device identifier database to determine whether the storage device belongs in another device slot which is different than the particular device slot;

wherein the storage device identifier database includes multiple database entries corresponding to the multiple device slots; and wherein the method further comprises:

prior to receiving the current storage device identifier in response to installation of the storage device into the particular device slot of the electronic system, (i) writing a current storage device identifier associated with the storage device to the storage device and (ii) updating a database entry of the storage device identifier database with the current storage device identifier;

wherein writing and updating occur during a logical unit number (LUN) binding process in which the storage device is bound to a particular LUN.

11. The method as in claim 10, wherein the electronic system further includes a controller and multiple storage processors;

wherein the storage device is a magnetic disk drive and the multiple device slots are constructed and arranged to receive multiple magnetic disk drives;

wherein the controller is constructed and arranged to receive the current storage device identifier in response to installation of the storage device into the particular device slot;

wherein each storage processor of the multiple storage processors is constructed and arranged to write data received from a set of hosts to the storage device;

wherein preventing overwriting of the storage device while the storage device resides in the particular device slot includes:

stopping, by the controller, the multiple storage processors from overwriting data on the storage device with data which the multiple storage processors received from the set of hosts; and wherein permitting overwriting of the storage device while the storage device resides in the particular device slot includes:

allowing, by the controller, the multiple storage processors to overwrite data on the storage device with data which the multiple storage processors received from the set of hosts.

12. An electronic system, comprising:

a framework having multiple device slots;

data storage circuitry coupled to the framework, the data storage circuitry being constructed and arranged to access storage devices installed in the framework; and a controller coupled to the data storage circuitry to control storage device use, the controller being constructed and arranged to:

receive a current storage device identifier in response to installation of a storage device into a particular device slot of the framework, perform an electronic storage device location assessment operation based on the current storage device identifier, and in response to performing the electronic storage device location assessment operation, provide a control signal which selectively (i) permits the data storage circuitry to overwrite the storage device while the storage device resides in the particular device slot, and (ii) prevents the data storage circuitry from overwriting the storage device while the storage device resides in the particular device slot, wherein the current storage identifier is associated with the storage device;

wherein a prior storage device identifier is associated with the particular device slot;

wherein providing the control signal includes:

outputting (i) an overwrite disable value for the control signal which prevents overwriting of the storage device while the storage device resides in the particular device slot when the current storage device identifier does not match the prior storage device identifier and the storage device is a critical disk which belongs to a redundant array of inexpensive disks (RAID) group which is missing at least two disks in their proper locations and (ii) an overwrite enable value for the control signal which permits overwriting of the storage device while the storage device resides in the particular device slot when the current storage device identifier does not match the prior storage device identifier and the storage device is not a critical disk which belongs to a RAID group which is missing at least two disks in their proper location; and wherein the controller, when performing the electronic storage device assessment operation, is constructed and arranged to:

generate an electronic comparison result indicating whether the current storage device identifier matches the prior storage device identifier, wherein the controller, when performing the electronic storage device location assessment operation, is further constructed and arranged to:

when the comparison result indicates that the current storage device identifier does not match the prior storage device identifier, prompt a user for permission to overwrite the storage device prior to any overwriting of the storage device.

13. The electronic system as in claim 12, further comprising:

a storage device identifier database; and wherein the controller, when performing the electronic storage device location assessment operation, is further constructed and arranged to:

search the storage device identifier database to determine whether the storage device belongs in another device slot which is different than the particular device slot, when the comparison result indicates that the current storage device identifier does not match the prior storage device identifier.

14. The electronic system as in claim 13 wherein the controller, when performing the electronic storage device location assessment operation, is further constructed and arranged to:

provide a message on a display indicating that the storage device belongs in another device slot which is different than the particular device slot when the storage device belongs in the other device slot, in response to searching the storage device identifier database.

15. The electronic system as in claim 14 wherein the controller, when providing the message on the display, is constructed and arranged to:
   output, on the display, a visual identification of the other device slot within which the storage device belongs.

16. The electronic system as in claim 13 wherein the storage device identifier database includes multiple database entries corresponding to the multiple device slots; and wherein the controller is further constructed and arranged to:
   prior to receiving the current storage device identifier in response to installation of the storage device into the particular device slot of the electronic system, (i) write the current storage device identifier to the storage device and (ii) update a database entry of the storage device identifier database with the current storage device identifier.

17. The electronic system as in claim 16 wherein the controller, when writing and updating, is constructed and arranged to carry out such writing and updating during a logical unit number (LUN) binding process in which the storage device is bound to a particular LUN.

18. The electronic system as in claim 12 wherein the controller, when providing the control signal, is constructed and arranged to:
   output (i) an overwrite enable value for the control signal which permits overwriting of the storage device while the storage device resides in the particular device slot when the current storage device identifier matches the prior storage device identifier, and (ii) an overwrite disable value for the control signal which prevents overwriting of the storage device while the storage device resides in the particular device slot when the current storage device identifier does not match the prior storage device identifier.

19. The electronic system as in claim 12 wherein the controller, when providing the control signal, is further constructed and arranged to:
   output an overwrite enable value for the control signal which permits overwriting of the storage device while the storage device resides in the particular device slot when the current storage device identifier matches the prior storage device identifier.

20. The electronic system as in claim 12, wherein the data storage circuitry includes multiple storage processors;
   wherein each storage processor of the multiple storage processors is constructed and arranged to write data received from a set of hosts to from the storage device;
   wherein the storage device is a magnetic disk drive and the multiple device slots are constructed and arranged to receive multiple magnetic disk drives;
   wherein preventing overwriting of the storage device while the storage device resides in the particular device slot includes:
      stopping, by the controller, the multiple storage processors from overwriting data on the storage device with data which the multiple storage processors received from the set of hosts; and
   wherein permitting overwriting of the storage device while the storage device resides in the particular device slot includes:
      allowing, by the controller, the multiple storage processors to overwrite data on the storage device with data which the multiple storage processors received from the set of hosts.

\* \* \* \* \*